United States Patent
Swain

(10) Patent No.: US 7,527,703 B2
(45) Date of Patent: May 5, 2009

(54) SUBMERGED MASONRY SURFACE TREATING METHOD

(76) Inventor: Jeffrey Swain, 1223 W. Tharpe St., Tallahassee, FL (US) 32303

( * ) Notice: Subject to any disclaimer, the term of this patent is extended or adjusted under 35 U.S.C. 154(b) by 101 days.

(21) Appl. No.: 10/937,164

(22) Filed: Sep. 9, 2004

(65) Prior Publication Data

US 2006/0048882 A1 Mar. 9, 2006

(51) Int. Cl.
*E04B 2/00* (2006.01)
*E04F 13/02* (2006.01)

(52) U.S. Cl. .................. 156/71; 156/307.3; 156/307.4

(58) Field of Classification Search ............ 52/742.16, 52/390, 745.16, 360; 156/346, 71, 307.3, 156/307.4; 427/402, 410, 421.1, 427.6, 427.7, 427/428.01, 428.02, 429
See application file for complete search history.

(56) References Cited

U.S. PATENT DOCUMENTS

| | | | | |
|---|---|---|---|---|
| 1,913,031 A | * | 6/1933 | Kertes | 52/392 |
| 3,647,499 A | * | 3/1972 | Colt et al. | 430/49.3 |
| 3,759,915 A | | 9/1973 | Kottke | |
| 3,854,267 A | | 12/1974 | Weiant et al. | |
| 3,859,233 A | | 1/1975 | Barker | |
| 3,919,146 A | | 11/1975 | Emmons | |
| 4,273,813 A | * | 6/1981 | Meddaugh | 427/387 |
| 4,296,932 A | | 10/1981 | Grobler | |
| 4,342,796 A | * | 8/1982 | Brown et al. | 427/136 |
| 4,395,443 A | | 7/1983 | Shimizu et al. | |
| 4,472,540 A | | 9/1984 | Barker | |
| 4,642,265 A | * | 2/1987 | Suzuki | 428/375 |
| 4,753,977 A | * | 6/1988 | Merrill | 524/588 |
| 4,810,748 A | | 3/1989 | Spells | |
| 4,999,066 A | * | 3/1991 | Sherif | 156/71 |
| 5,205,860 A | | 4/1993 | Narula et al. | |
| 5,326,845 A | | 7/1994 | Linden | |
| 5,405,896 A | * | 4/1995 | Fujiki et al. | 524/265 |
| 5,421,867 A | | 6/1995 | Yeager et al. | |
| 5,569,696 A | | 10/1996 | Abramson et al. | |

(Continued)

FOREIGN PATENT DOCUMENTS

JP 49071007 A * 7/1974

(Continued)

OTHER PUBLICATIONS

English Abstract of JP 49-71007.*

(Continued)

*Primary Examiner*—Philip C Tucker
*Assistant Examiner*—Sing P Chan
(74) *Attorney, Agent, or Firm*—J. Wiley Horton

(57) ABSTRACT

A method for sealing or resealing a masonry surface in a swimming pool. In a new pool, spa, or similar structure, the masonry surface is cleaned and prepped. A diluted mixture of silicone sealant is then applied to the surface. Staining dyes are optionally added to the sealing formulation. In the case of an old pool, voids and cracks are sealed with a filler. The diluted mixture of silicone sealant is then applied over the old plaster and the filler materials to reseal the surface. Staining dyes may be optionally added to this application of the inventive method as well. A second formulation of the sealant can be used to affix and grout tiles in order to seal all or part of a pool's wall surface.

19 Claims, 10 Drawing Sheets

U.S. PATENT DOCUMENTS

| | | | |
|---|---|---|---|
| 5,583,170 A * | 12/1996 | Wrobel | 524/140 |
| 5,593,483 A * | 1/1997 | Brunken | 106/2 |
| 5,807,921 A | 9/1998 | Hill et al. | |
| 5,968,257 A | 10/1999 | Ahrens | |
| 6,174,461 B1 | 1/2001 | Miksic et al. | |
| 6,180,228 B1 * | 1/2001 | Mueller et al. | 428/354 |
| 6,521,703 B2 | 2/2003 | Zarnoch et al. | |
| 6,602,964 B2 | 8/2003 | Huang et al. | |
| 6,706,798 B2 * | 3/2004 | Kobayashi et al. | 524/493 |
| 2003/0171047 A1 * | 9/2003 | Calvo et al. | 442/76 |

FOREIGN PATENT DOCUMENTS

JP        05321441 A  *  12/1993

OTHER PUBLICATIONS

English Abstract of JP 05-321441.*
English Machine Translation of JP 05-321441.*

* cited by examiner

SUBMERGED MASONRY SURFACE TREATING METHOD

BACKGROUND OF THE INVENTION

1. Field of the Invention

This invention relates to the field of swimming pools, spas, and fountains. More specifically, the invention comprises a method for sealing the surface of a new or reconditioned masonry structure.

2. Description of the Related Art

Concrete pools have been in common use for many years. These pools are formed as a thin concrete shell (typically 4 to 6 inches thick) surrounded by earth. The shell is typically reinforced by wire mesh or re-bar. Once cured, the inward-facing surface of the concrete shell must be sealed in order to contain the pool water. This sealing is typically accomplished by adding a layer of marcite plaster (masonry plaster) over the concrete.

Those skilled in the art will know that properly adding the marcite layer to a pool is a job requiring some skill. Variations in the thickness of the layer can cause cracking, crazing, or delamination. This step has traditionally been labor-intensive, and represents a significant cost in the construction of a new pool.

FIG. 1 shows a prior art swimming pool 10. The pool is bounded by wall 12 (The term "wall" is intended to include all inward facing surfaces, such as the bottom). It may also feature a decorative tile band 14 near the top. FIG. 2 shows a closer view of wall 12 on a pool that has been in service for a few years. Cracks 14 typically appear in the marcite layer. If a piece of marcite actually breaks away, a void 16 results. Both the cracks and the voids allow the pool water to penetrate to the underlying concrete (The marcite is actually porous, but much less so than the underlying concrete). As the concrete itself is porous, this water leaks out of the pool. The water penetration can also damage the concrete structural shell.

FIG. 3 shows a section through wall 12. A gap in the plaster 22 is labeled as void 16. Water entering this void will seep through the concrete.

Some leakage can be tolerated. However, once a significant number of cracks and voids are present, the pool must be resurfaced. The water is drained, and the old marcite plaster layer is chipped or ground away. After the underlying concrete surface is cleaned and prepared, a new marcite plaster layer is added. The cost of such an operation is substantial. It may also take the pool out of service for many weeks.

BRIEF SUMMARY OF THE PRESENT INVENTION

The present invention comprises a new method for sealing or resealing a masonry surface against water penetration. In a new pool, the masonry surface is cleaned and prepped. A diluted mixture of silicone sealer is then applied to the surface. Staining dyes may be added to the sealing formulation. Alternatively, staining dyes may be applied to the masonry surface prior to adding the sealing formulation.

In the case of an old pool, voids and cracks are sealed with a filler. The diluted mixture of silicone sealant is then applied over the old plaster and the filler materials to reseal the surface. Staining dyes may be optionally added to this application of the inventive method as well. A second formulation of the sealer can be used to affix and grout tiles in order to seal all or part of a pool's wall surface.

REFERENCE NUMERALS IN THE DRAWINGS

| | | | |
|---|---|---|---|
| 10 | swimming pool | 12 | wall |
| 14 | tile band | 16 | void |
| 18 | concrete | 20 | reinforcement |
| 22 | plaster | 24 | filler |
| 26 | roller | 28 | sealer |
| 30 | sealer penetration | 32 | unfinished surface |
| 34 | adhesive | 36 | tile |
| 38 | spray gun | 40 | paint brush |

DETAILED DESCRIPTION OF THE INVENTION

The present invention is used for two related applications: (1) enhancing the seal and finish of the wall on an older pool; and (2) sealing the wall of a new pool. The first application will be discussed initially.

Figure 1:
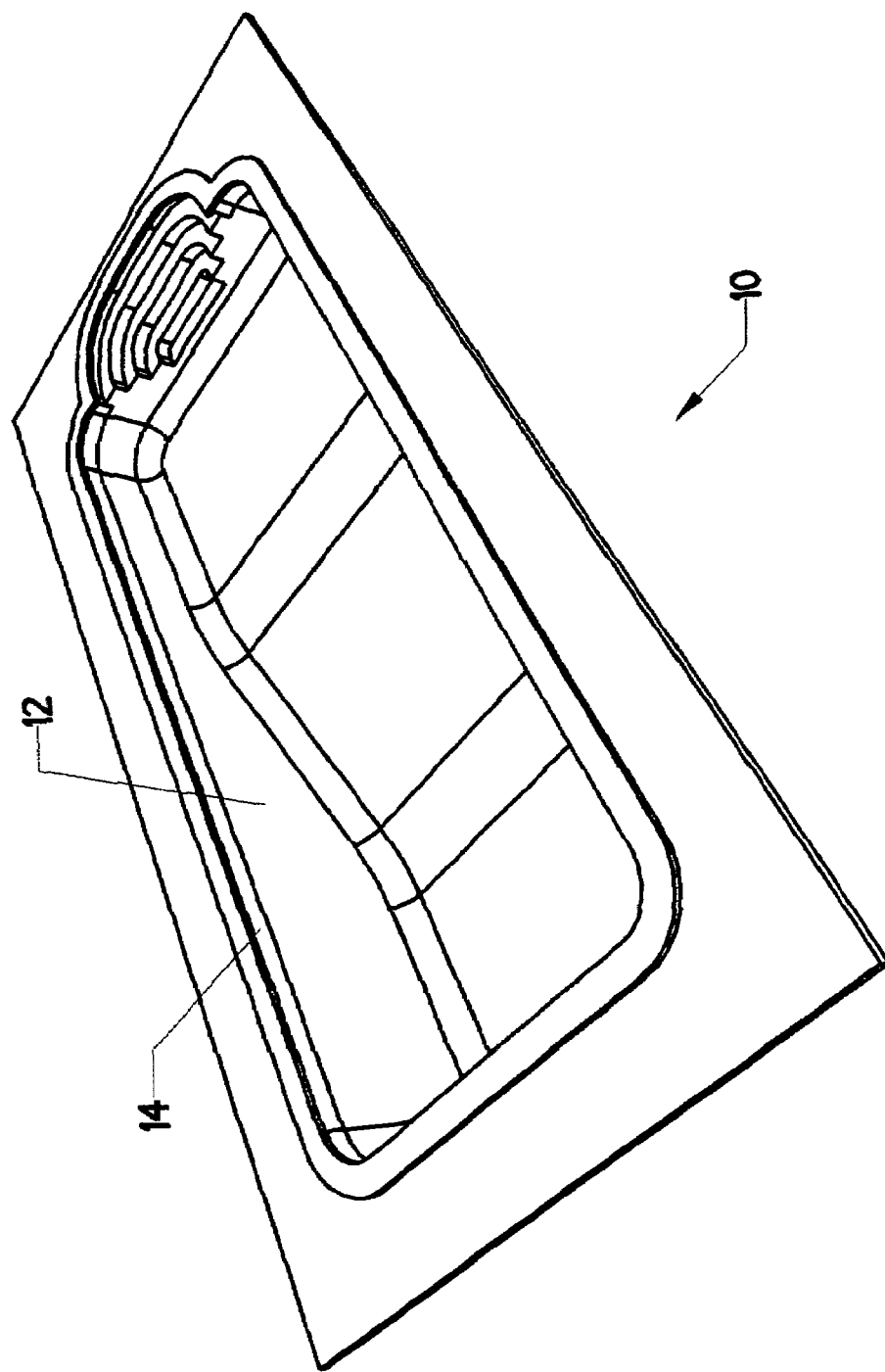
FIG. 1 is a perspective view, showing a prior art swimming pool.
Figure 2:
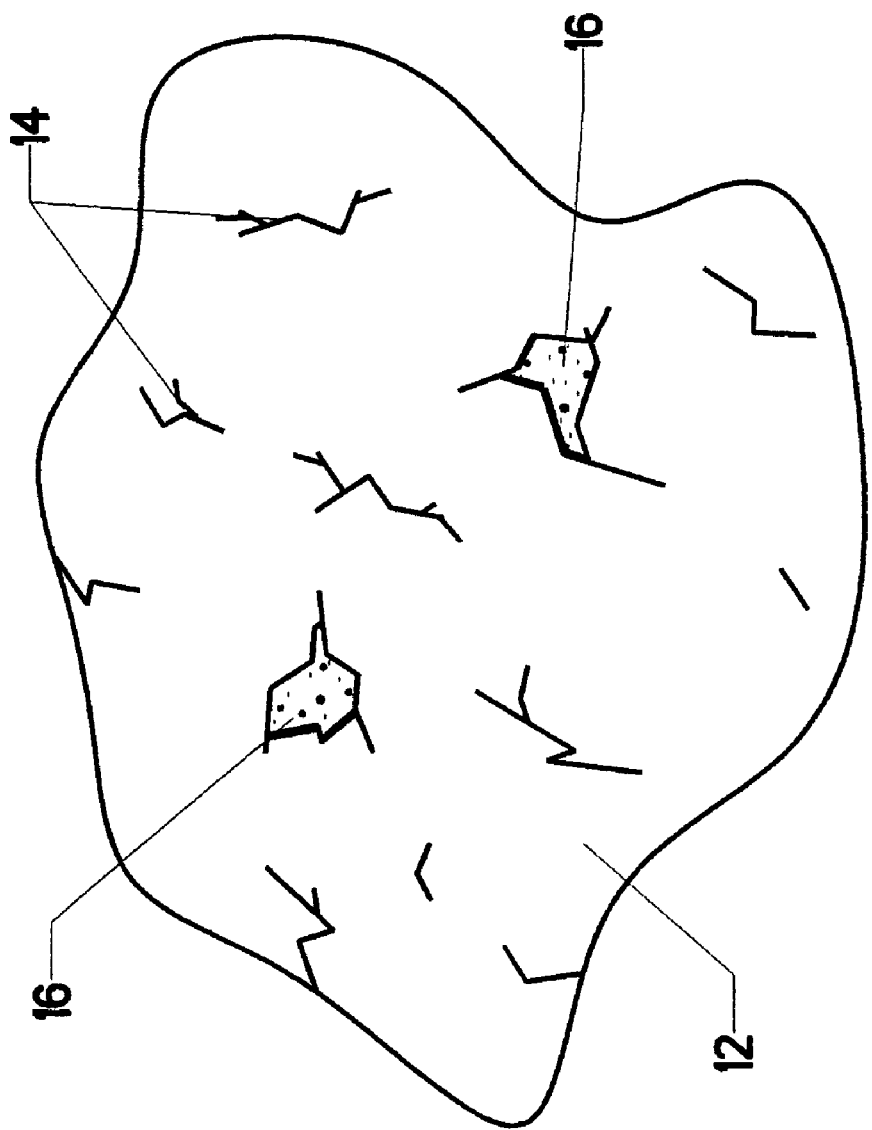
FIG. 2 is a detail view, showing the wall of a swimming pool.

Returning briefly to FIGS. 2 and 3, the reader will recall that a pool wall that has been in use for some years will typically develop cracks 14 and voids 16. The inventive process is capable of sealing such a pocked surface without significant preparatory work. However, most owners do not wish to leave the disfigured surface in place. It is therefore desirable to fill the cracks and voids. The pool must of course be drained. Because moisture will have typically seeped into the wall of the pool—owing to the failure of the plaster—it is advisable to remove as much of this moisture as possible. Heat may be applied to the surface over a period of time to drive the moisture out. Drying agents, such as acetone, may be applied. In favorable weather conditions, simply allowing the pool to remain dry for several days may be sufficient.

Once the wall is suitably dry, the patching operation can commence. FIG. 4 shows the same wall seciton as FIG. 3, after filler 24 has been used to fill the voids and cracks.

Numerous filler compounds can be used, including plaster, mortar, and synthetic products. Once the surface has been smoothed by the additional filler, it can be sanded if a more polished finish is desired. The surface finish is typically a question of the pool owner's aesthetic tastes. A finer and more even surface finish requires more labor and is therefore more expensive. The reader should appreciate that the present inventive process functions quite well using a very roughly finished surface, a very finely finished surface, or anything in between.

When the surface preparation is completed, a sealing formulation is applied. The methods of application will be discussed subsequently. The sealant itself will be discussed initially. The sealing formulation is primarily a mixture of silicone oils diluted in mineral spirits. Silicone oils form an excellent moisture barrier. In order to form a barrier of sufficient thickness, it is preferable to have the silicone oils penetrate a significant distance into the pool wall.

The plaster coating and underlying concrete are both porous. Water does not tend to penetrate properly-applied plaster because the voids in the plaster are not large enough (owing to the surface-tension characteristics of water preventing its entry into a small void). If the silicone oils are diluted with an agent which can reduce this surface tension issue, the oils can be wicked deeply into the plaster and concrete by capillary action. In fact, the oils will seep through the plaster coating and penetrate significantly into the concrete itself.

One good diluting agent is simply mineral spirits. A mixture of mineral spirits and silicone oils is easily formed and applied. The mineral spirits will then evaporate, allowing the silicone oils to dry and form a penetrating moisture barrier. The term "Silicone Oil" will be understood herein to refer to a compound containing a polydimethylsiloxane (PDMS) chain (such as polydimethylsiloxane or polydimethylsiloxanediol). The term "Silicone Fluid" will be understood to describe a PDMS-containing compound wherein cross-linking is established to increase the viscosity to form a gel. The following are examples of suitable mixtures:

EXAMPLE I

A first mixture is formed by mixing the following ingredients, stated on the basis of percentage by weight:

| | |
|---|---|
| Silicone Oil (polydimethysiloxanediol) | 75% |
| Silicone Fluid | 15% |
| Amorphous Silica | 7% |
| Other Ingredients | 3% |

This first mixture is then diluted using mineral spirits to form a second mixture according to the following formula by weight: 15-25% of the first mixture diluted by 75-85% mineral spirits. This second mixture is then applied to the pool wall.

EXAMPLE II

A first mixture is formed by mixing the following ingredients, stated on the basis of percentage by weight:

| | |
|---|---|
| Silicone Oil | 50-75% |
| Silicone Fluid | 5-20% |
| Amorphous Silica | 2-10% |
| Other Ingredients | 5-40% |

This first mixture is then diluted using mineral spirits to form a second mixture according to the following formula by weight: 10-50% of the first mixture diluted by 50-90% mineral spirits. This second mixture is then applied to the pool wall.

The amount of dilution required for effective operation depends in part upon the method of application used and in part upon the porosity of the surface to which the sealant is applied (A surface having smaller pores generally needs a sealant having lower viscosity to obtain proper wicking action). For some surfaces, a simple mixture of silicone oil and mineral spirits will work, as specified below:

EXAMPLE III

| | |
|---|---|
| Silicone Oil | 10-50% |
| Mineral Spirits | 50-90% |

Figure 5:
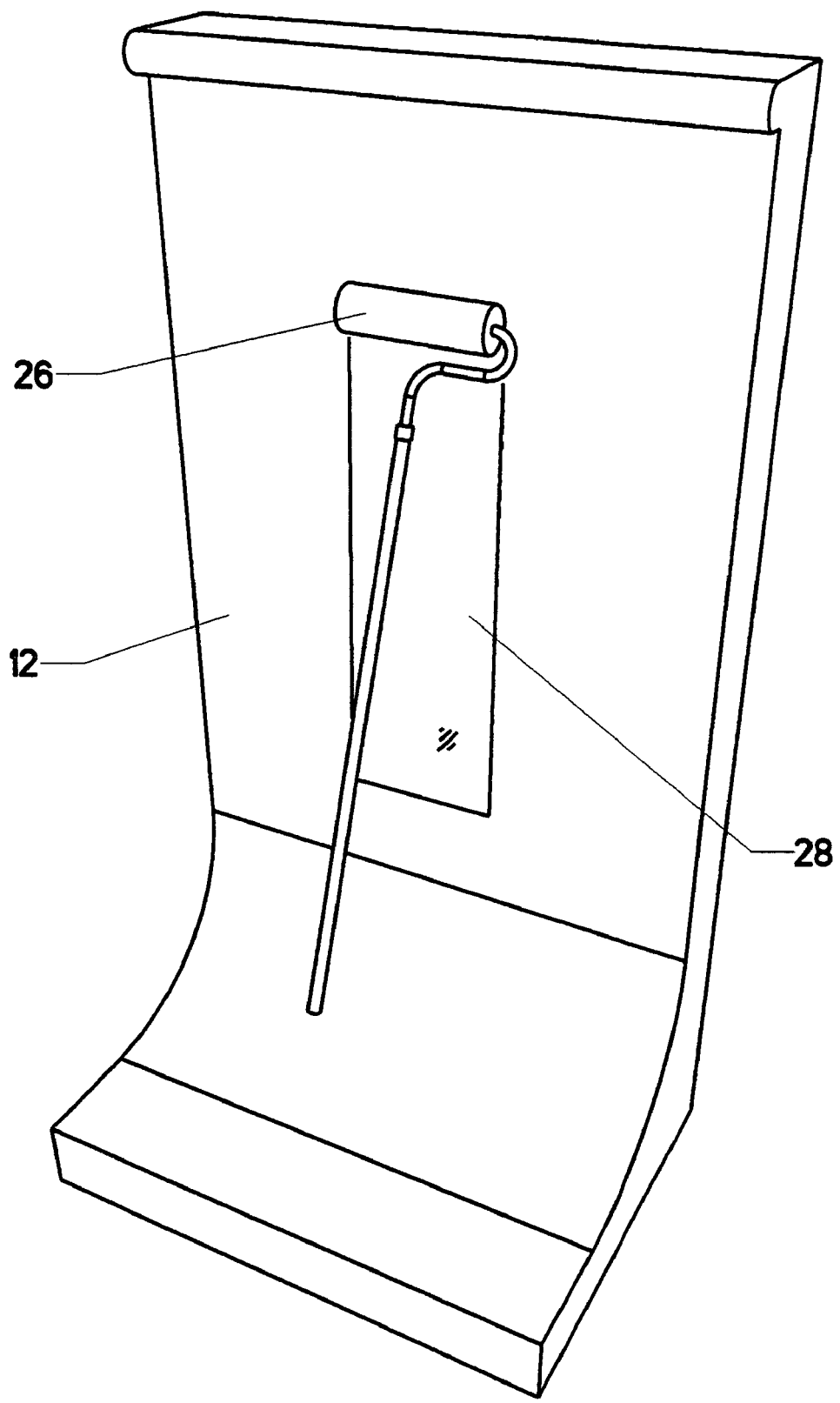
FIG. 5 is a perspective view, showing the step of rolling on the sealant.

This simplified mixture is then applied to the pool wall. Various methods of application will now be discussed. For mixtures having a higher viscosity, the sealant can be rolled on using a conventional paint roller. FIG. 5 shows the use of roller 26 to roll sealer 28 onto pool wall 12. This approach allows a rapid and even coating of all the pool surfaces.

Figure 3:
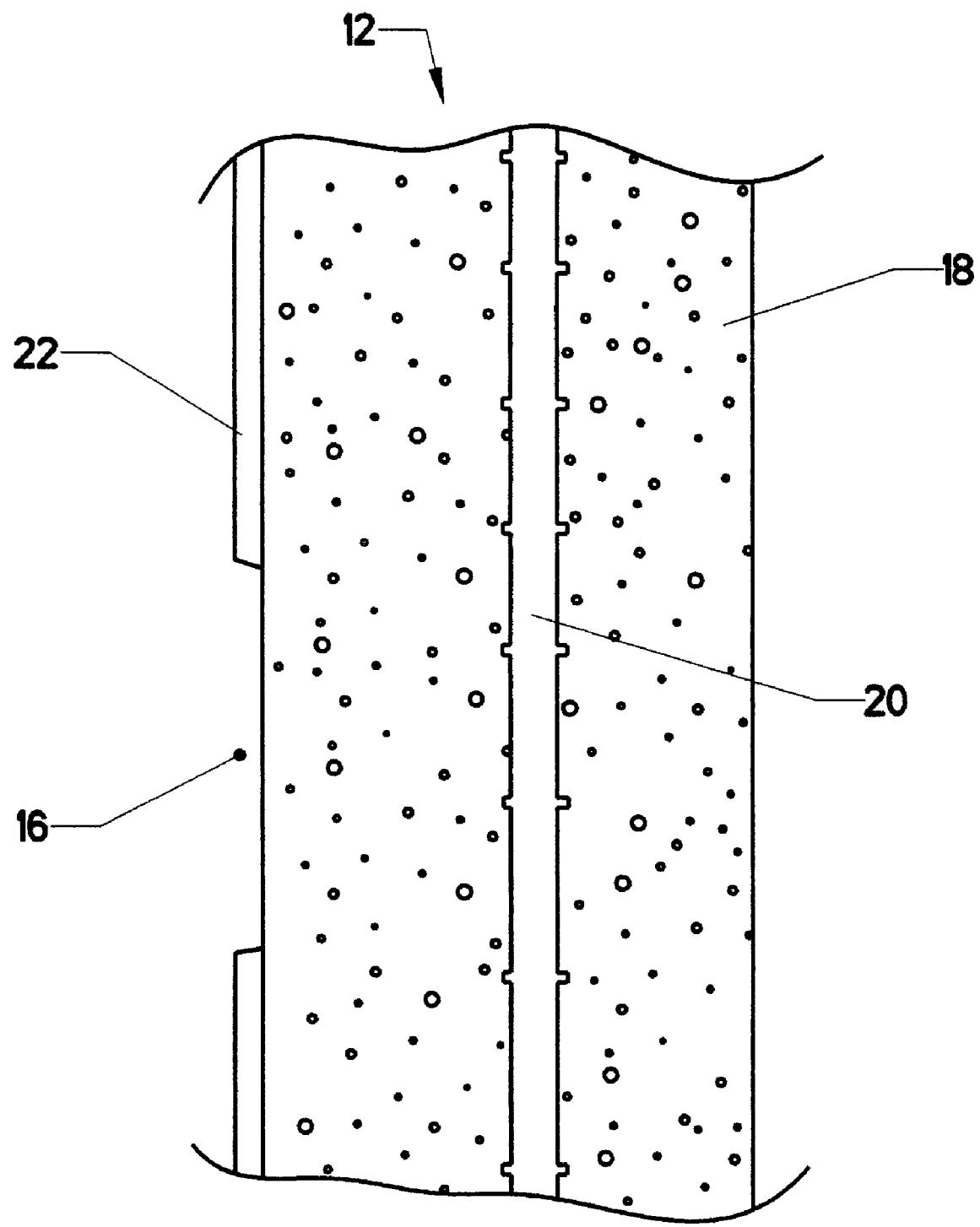
FIG. 3 is a section view, showing the structure of a swimming pool wall.
Figure 4:
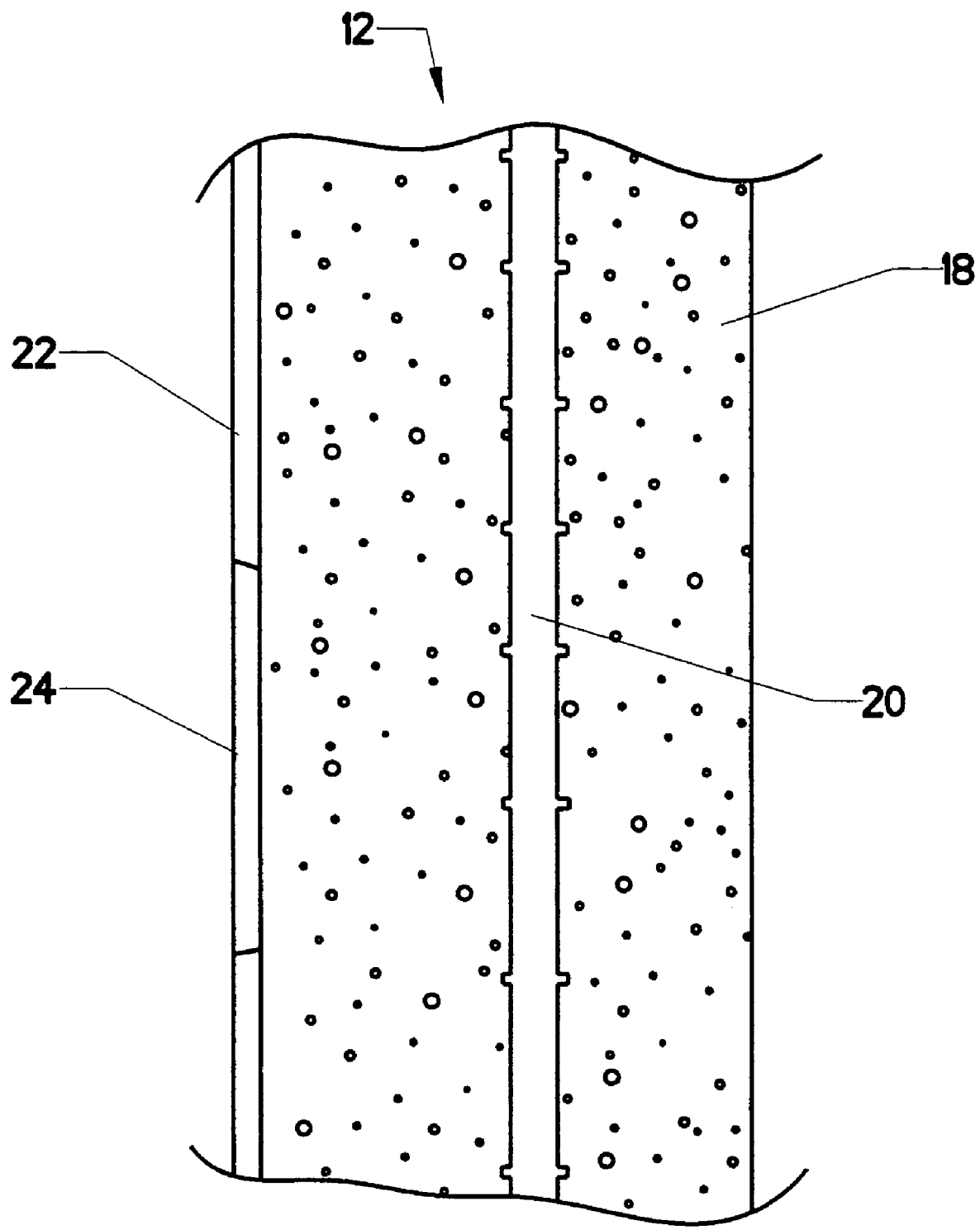
FIG. 4 is a section view, showing the step of filling voids in the masonry plaster layer.
Figure 6:
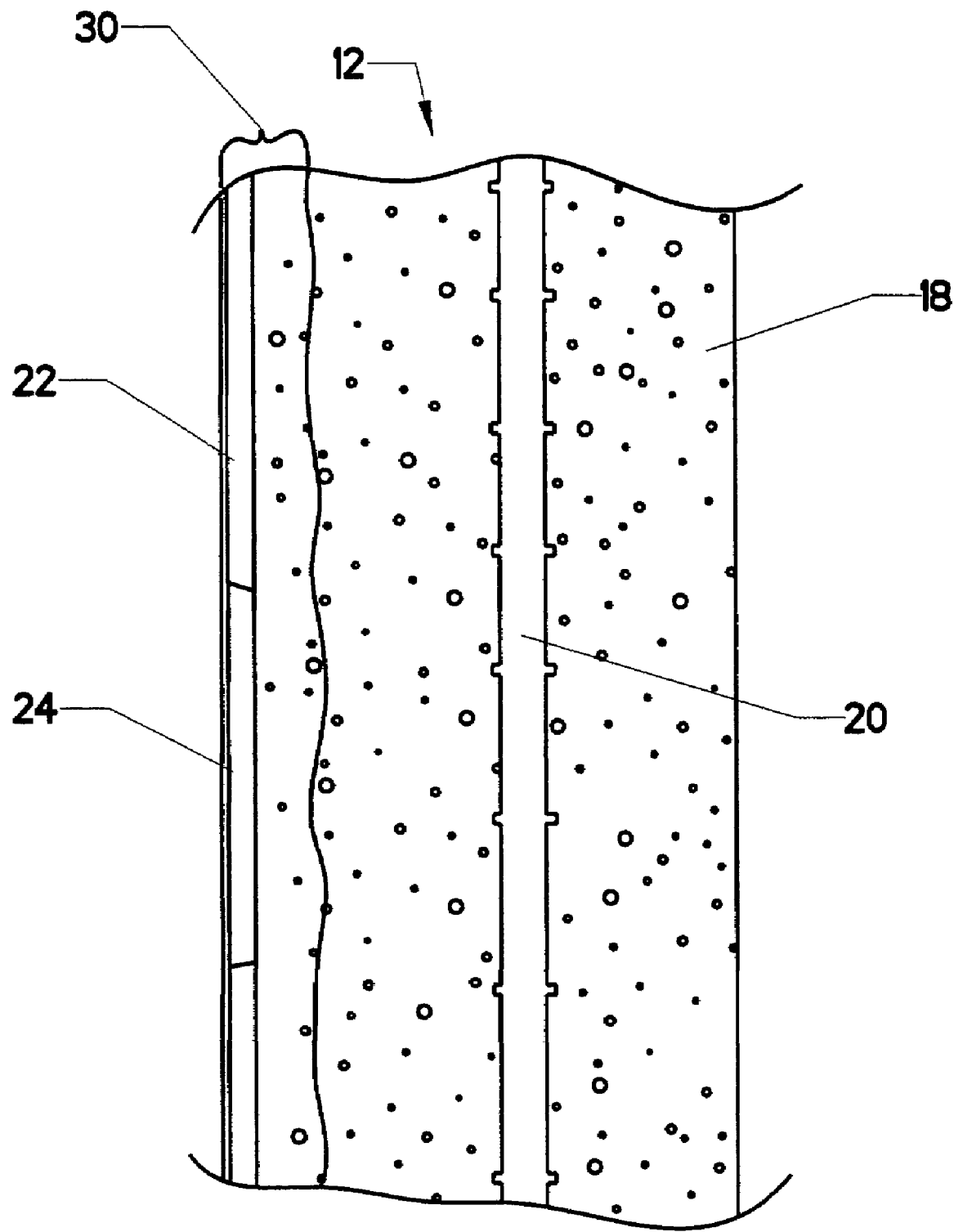
FIG. 6 is a section view, showing how the sealant penetrates the masonry

FIG. 6 shows the same wall section as shown as FIGS. 3 and 4 after the sealer has been applied. The sealer has soaked through the plaster, the filler material, and the underlying concrete. The depth of penetration is designated in the view as sealer penetration 30. Within this region, the sealer has filled all the available voids, thereby forming a moisture barrier.

Figure 9:
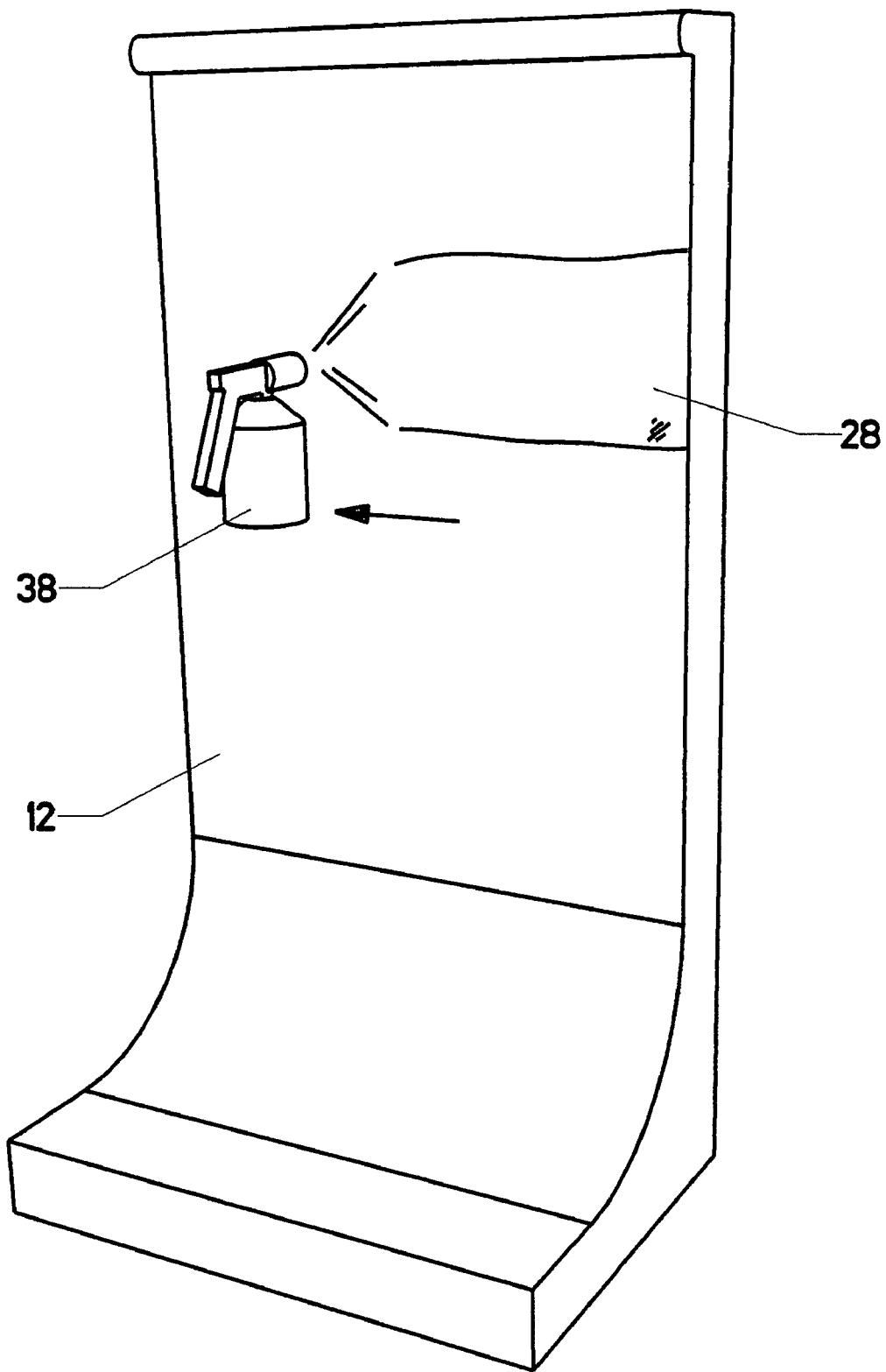
FIG. 9 is a perspective view, showing the sealant being sprayed onto the surface of a pool.

Those skilled in the art will realize that other application methods are available. If the sealer is sufficiently thinned, it can be sprayed onto the surface. FIG. 9 shows the use of spray gun 30 to deposit sealer 28 on pool wall 12 (Throughout this disclosure, it will be understood that the term "pool wall" includes all inward-facing surfaces of the pool).

Figure 10:
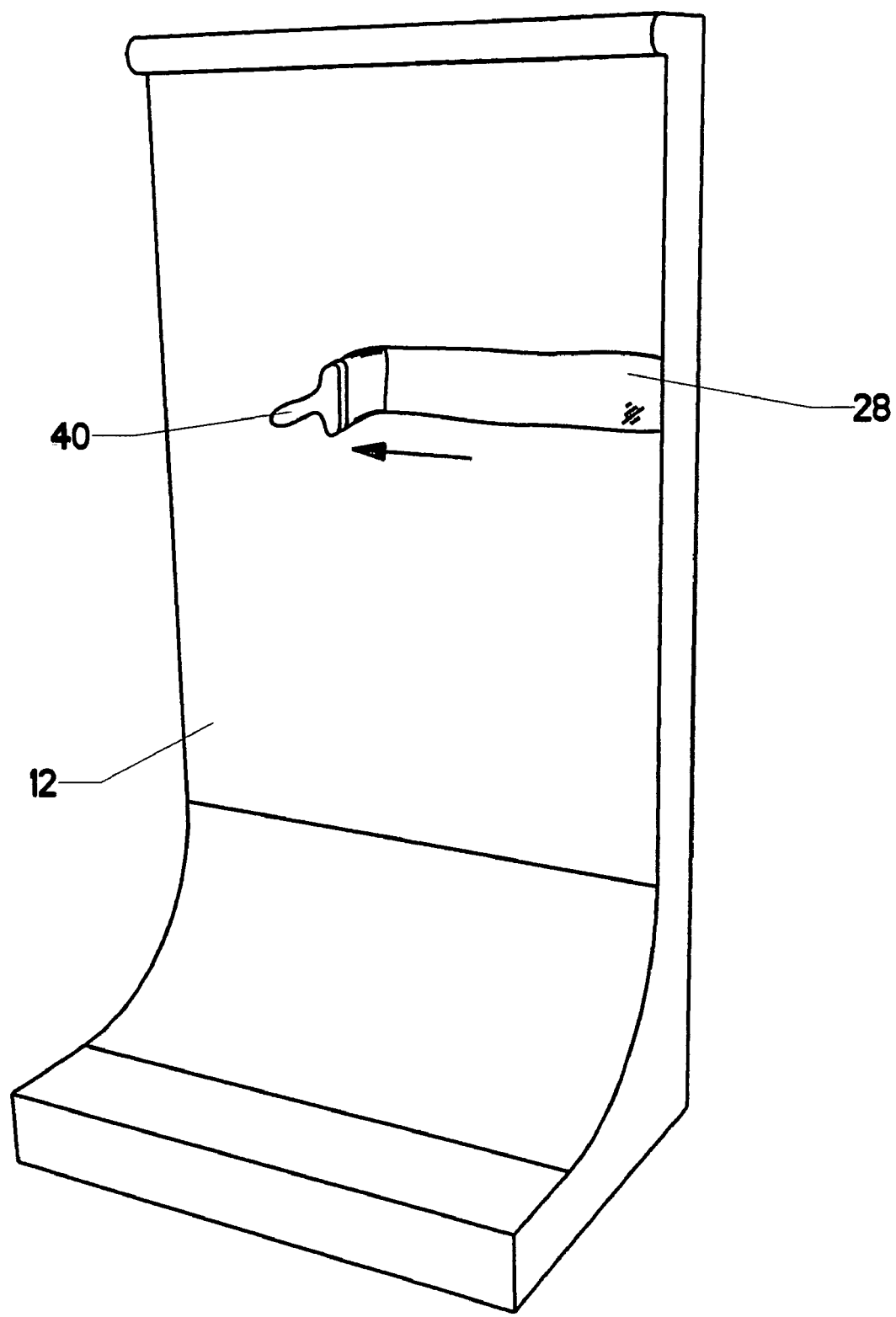
FIG. 10 is a perspective view, showing the sealant being saturated into the surface of a pool.

FIG. 10 shows the use of paint brush 40 to paint the sealer on. This method obviously works well with formulations of widely differing viscosities.

The use of the penetrating sealer introduces an opportunity to mask aesthetic problems in a refinished pool. If voids and cracks are patched in a pool, there will often be variations in the color and texture of the finished surface. It is possible to add a dye to the sealer which greatly masks these surface imperfections. As an example, a medium blue dye can be added to the sealer. This will impart a uniform blue "wash" to the surface of the pool. Natural color variations will occur across the surface (as with any concrete or plaster staining process), thereby providing a variation of hues. This variation will then tend to mask any surface imperfections, especially after the pool is filled with water and the natural refractive light patterns play across the pool wall.

It is also possible to paint a pattern onto the bare prepped masonry surface prior to adding the sealing agent. This allows different colors and different application methods (brushes, sponges, washes, etc.) to be employed to obtain a diverse and pleasing pattern. Te sealer can the be applied over the pattern, possibly with dye added to the sealer as well.

As discussed initially, the inventive process can also be used to seal the wall of a new pool. In this sense, the inventive process becomes a substitute for using marcite plaster or other labor-intensive processes. Once the concrete of a pool wall is fully cured, the surface is preferably prepared by cleaning. The sealer is then applied directly to the concrete surface, using any suitable technique (including those discussed previously).

Figure 7:
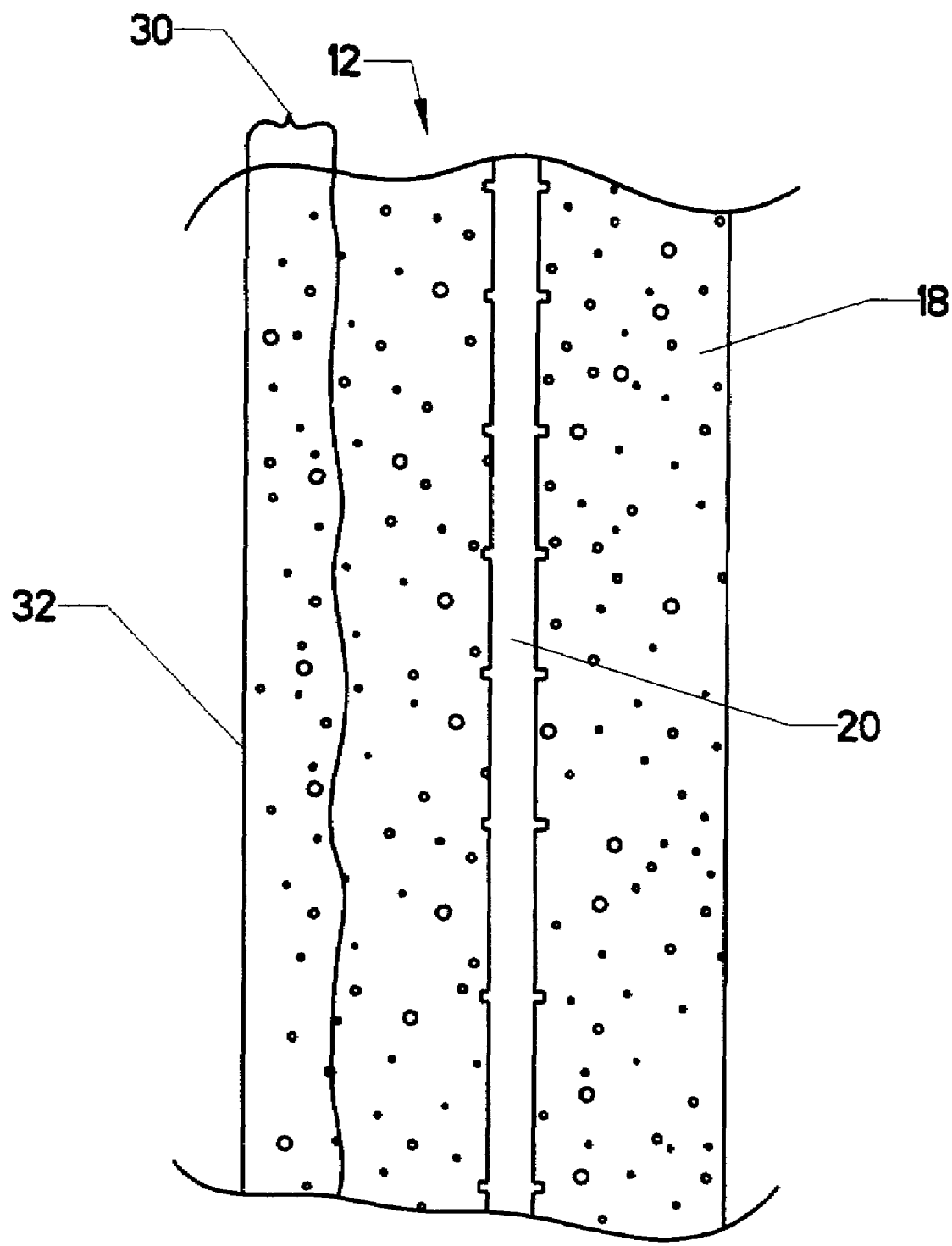
FIG. 7 is a section view, showing how the sealant penetrates bare masonry.

FIG. 7 shows the result. The sealer has penetrated directly into unfinished surface 32 and wicked into the concrete in the region designated as sealer penetration 30. This provides a moisture barrier without the addition of any plaster. This approach produces a long-lasting finish, since it is not dependent upon the limited life of a plaster coating. In the event that some moisture resistance is lost, of course, the pool wall can always be re-coated with sealer. The addition of a dye is possible with this application of the inventive process as well.

From the initial description of prior art pools, the reader will recall that some pools incorporate a decorative tile band near the surface of the water. Tiles can be used to seal a masonry pool. The entire pool can, in fact, be covered with tile if the owner so desires. The present inventive process can also be used to affix and seal tiles over any desired area (to include all inward-facing surfaces, if desired).

A thicker version of the silicone compounds is desirable for use as an adhesive to bond the tiles to the pool wall. Thickening is obtained through the use of more cross-linking of the PDMS chains. In simple terms, more silicone fluid is used and less silicone oil is used. The following is an example of a suitable adhesive, stated on the basis of weight:

EXAMPLE IV

| Silicone Oil | 10-30% |
|---|---|
| Silicone Fluid | 30-50% |
| Amorphous Silica | 0-10% |
| Other Ingredients | 10-60% |

Figure 8:
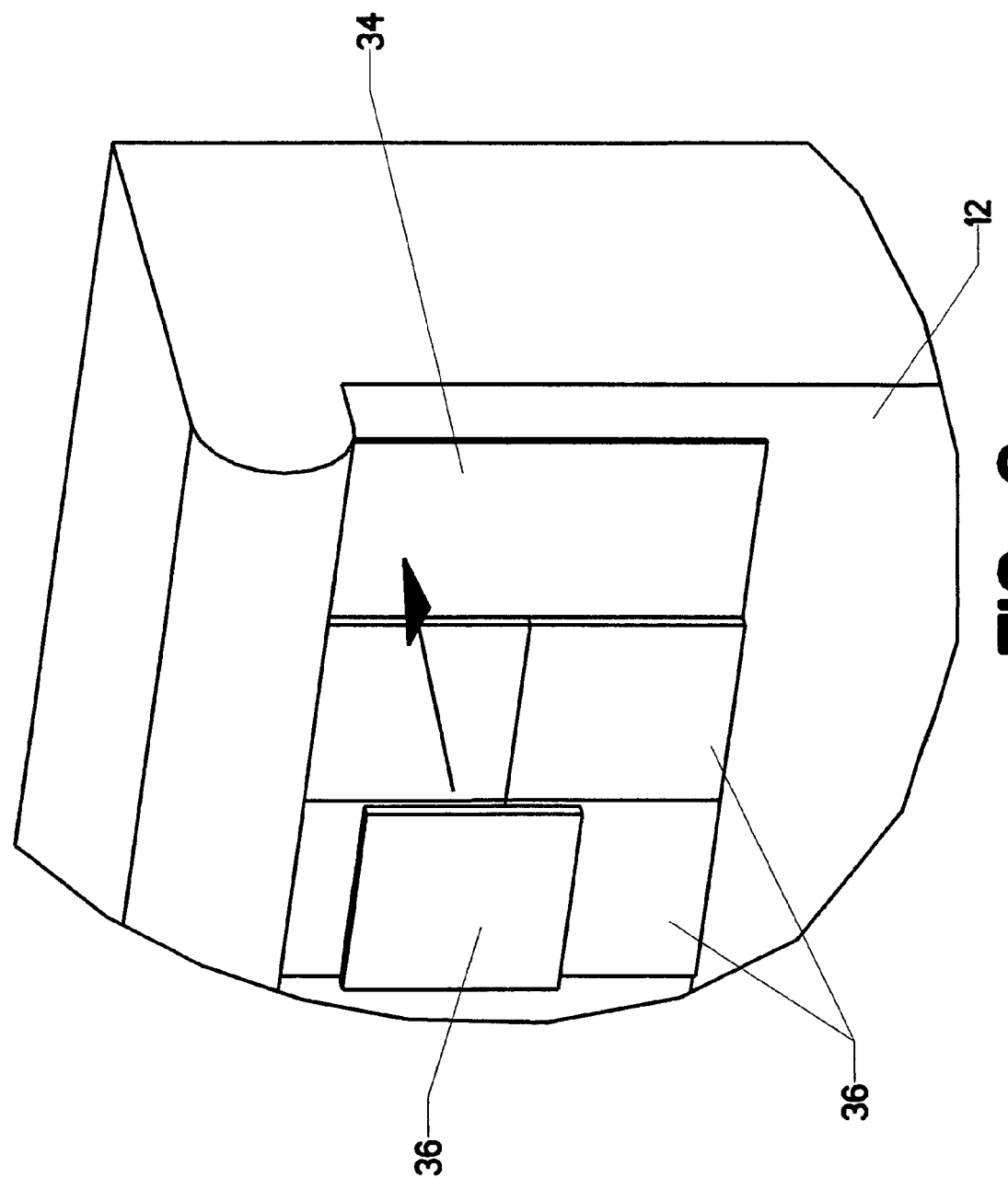
FIG. 8 is a perspective view, showing how the alternate formulation can be used to apply and grout tile.

This mixture is generally brushed or troweled on. FIG. 8 shows a section of pool wall 12 with adhesive 34 (such as EXAMPLE IV) being added in a region to which tiles will be affixed. Tiles 36 are then pressed into the uncured adhesive. The adhesive then cures, locking the tiles in place.

The same general formulation can then be used as a grout, although it may be desirable to lower the viscosity and cure time somewhat using either silicone oil or mineral spirits. The grout can be applied using a rubber float and then wiped off unwanted areas using a sponge dampened with water, mineral spirits, or other suitable solvent. Once fully cured, the adhesive and grout combination will fully seal the tiles and form a moisture barrier.

This technique is effective for a small band or a pool which is completely covered in tile. In the case of a completely tile-covered pool, the tile affixing technique can be combined with using the sealer on the bare masonry (Silicone sealing the masonry is advisable prior to affixing the tiles).

Although the preceding description contains significant detail, it should not be viewed as limiting the invention but rather as providing examples of the preferred embodiments. Accordingly, the scope of the invention should be fixed by the following claims rather than by any examples given.

Having described my invention, I claim:

1. A method for sealing an inward-facing surface of a concrete pool, said inward-facing surface having a plurality of pores opening and extending into said surface, comprising:
   a. preparing said surface;
   b. providing a sealer, wherein said sealer includes
      i. between about 5% and about 50% silicone oil by weight;
      ii. between about 2% and about 15% silicone fluid by weight;
      iii. between about 1% and about 5% amorphous silica by weight;
      iv. between about 50% and about 90% mineral spirits by weight with said mineral spirits being in a sufficient concentration to reduce the viscosity of said sealer such that it wicks into said surface for a substantial distance without forming a film on said surface thereby filling said plurality of pores within said concrete for a substantial distance; and
   c. applying a sufficient quantity of said sealer to said surface to fill substantially all of said plurality of pores in said surface so that said sealer penetrates and seals said surface.

2. A method as recited in claim 1, wherein said step of applying said sealer to said surface is accomplished by rolling said sealer onto said surface using a paint roller.

3. A method as recited in claim 2, wherein said sealer further comprises a dye which stains said surface when said sealer is applied.

4. A method as recited in claim 1, wherein said step of applying said sealer to said surface is accomplished by spraying said sealer onto said surface.

5. A method as recited in claim 4, wherein said sealer further comprises a dye which stains said surface when said sealer is applied.

6. A method as recited in claim 1, wherein said step of applying said sealer to said surface is accomplished by brushing said sealer onto said surface.

7. A method as recited in claim 6, wherein said sealer further comprises a dye which stains said surface when said sealer is applied.

8. A method as recited in claim 1, wherein said sealer further comprises a dye which stains said surface when said sealer is applied.

9. A method as recited in claim 1, wherein said step of preparing said surface comprises filling the voids in any plaster present with a filler.

10. A method as recited in claim 9, wherein said sealer further comprises a dye which stains said surface when said sealer is applied.

11. A method as recited in claim 10, wherein said dye is dark enough to mask the imperfections in said surface.

12. A method as recited in claim 1, further comprising:
    d. providing a plurality of tiles;
    e. specifying an area of said surface to be covered by said plurality of tiles;
    f. providing a tile adhesive, wherein said tile adhesive includes
       i. between about 1% and about 20% amorphous silica by weight;
       ii. between about 1% and about 20% silicone oil by weight;
       iii. between about 20% and about 50% silicone fluid by weight;
    g. covering said area with said tile adhesive;
    h. placing said plurality of tiles into said tile adhesive so that said tiles are affixed to said surface of said pool; and
    i. using said tile adhesive to grout said plurality of tiles.

13. A method as recited in claim 12, wherein said sealer further comprises a dye which stains said surface when said sealer is applied.

14. A method as recited in claim 12, wherein said step of applying said sealer to said surface is accomplished by rolling said sealer onto said surface using a paint roller.

15. A method as recited in claim 14, wherein said sealer further comprises a dye which stains said surface when said sealer is applied.

16. A method as recited in claim 12, wherein said step of applying said sealer to said surface is accomplished by spraying said sealer onto said surface.

17. A method as recited in claim 16, wherein said sealer further comprises a dye which stains said surface when said sealer is applied.

18. A method as recited in claim 12, wherein said step of applying said sealer to said surface is accomplished by brushing said sealer onto said surface.

19. A method as recited in claim 18, wherein said sealer further comprises a dye which stains said surface when said sealer is applied.

* * * * *